United States Patent [19]
Takamatsu et al.

[11] Patent Number: 5,481,513
[45] Date of Patent: Jan. 2, 1996

[54] DISC CHANGING APPARATUS FOR DISC PLAYER INCLUDING IMPROVED TRANSLATING CHASSIS AND EJECT MECHANISM FOR DISC MAGAZINE

[75] Inventors: Ryoji Takamatsu; Tomohiro Watanabe; Koichi Nojima, all of Tokyo, Japan

[73] Assignee: Sony Corporation, Tokyo, Japan

[21] Appl. No.: 95,915

[22] Filed: Jul. 23, 1993

[30] Foreign Application Priority Data

Jul. 27, 1992 [JP] Japan .................................. 4-219786
Jul. 30, 1992 [JP] Japan .................................. 4-223206

[51] Int. Cl.$^6$ ........................... G11B 17/22; G11B 17/26
[52] U.S. Cl. ............................................ 369/36; 369/192
[58] Field of Search ................................. 369/34, 36, 38, 369/178, 192; 360/92, 96.5

[56] References Cited

U.S. PATENT DOCUMENTS

| | | | |
|---|---|---|---|
| 4,025,338 | 6/1989 | Sone ..................................... | 360/99.06 |
| 4,797,865 | 1/1989 | Imai et al. ................................. | 369/36 |
| 4,949,324 | 8/1990 | Arata ......................................... | 369/36 |
| 5,103,437 | 4/1992 | Kawakami ................................. | 369/36 |
| 5,123,001 | 6/1992 | Nakamichi et al. ....................... | 369/36 |
| 5,210,728 | 5/1993 | Noguchi et al. ........................... | 369/36 |
| 5,280,463 | 1/1994 | Okajima et al. ........................... | 369/36 |

FOREIGN PATENT DOCUMENTS 0284815 10/1988 European Pat. Off. .

OTHER PUBLICATIONS

Patent Abstracts of Japan, vol. 16, No. 571, Patent No. JP-A-03 238 660, Aug. 11, 1992 (Chigasaki).
Patent Abstracts of Japan, vol. 16, No. 24, Patent No. JP-A-03 238 660, Nov. 24, 1991 (Kiyoto).
Patent Abstracts of Japan, vol. 8, No. 105, Patent No. JP-A-59 014 162, Jan. 25, 1984 (Itsuki).

Primary Examiner—Stuart S. Levy
Assistant Examiner—George J. Letscher
Attorney, Agent, or Firm—Jay H. Maioli

[57] ABSTRACT

A disc changer player comprises a disc loading unit into which there is loaded a disc accommodating magazine in which a plurality of discs are accommodated in a stacked condition, a translating chassis having a disc reproducing operation mechanism mounted thereon and translating in a stacking direction of the discs relative to the disc loading portion, a selecting operation member for selecting a desired disc by controlling a translation of the translating chassis, and an eject mechanism for ejecting the disc accommodating magazine from the disc loading unit, wherein the disc accommodating magazine is ejected by controlling operation of the eject mechanism by the selecting operation member. Further, the disc changer player comprises a pair of opposing chassis, a plurality of feed screw shafts supporting the pair of opposing chassis, and a gear member through which the translating chassis is translated by a rotation of the plurality of feed screw shafts, wherein the gear member that is meshed with at least one feed screw shaft engages the translating chassis so that the gear member can be meshed with the feed screw shaft and the movable gear member is translated in accordance with an operation of the disc reproducing operation mechanism so as to be strongly meshed with the feed screw shaft.

3 Claims, 12 Drawing Sheets

DISC CHANGING APPARATUS FOR DISC PLAYER INCLUDING IMPROVED TRANSLATING CHASSIS AND EJECT MECHANISM FOR DISC MAGAZINE

BACKGROUND OF THE INVENTION

1. Field of the Invention

The present invention relates to an auto-changer player having a magazine in which a plurality of media such as discs (recording media) or the like are accommodated and selectively utilized.

2. Description of the Prior Art

In conventional auto-changer players for playing suitable media such as a disc or the like, most eject apparatus that load and eject an accommodating magazine for accommodating therein a disc or the like eject the accommodating magazine by driving a motor or the like (see Japanese laid-open patent publication No. 4-221455). In the eject apparatus operable by the driving of a motor, if the accommodating magazine is erroneously loaded when the power supply switch is turned off, the motor cannot be driven and hence the accommodating magazine cannot be ejected. Therefore, the accommodating magazine is ejected by using special tools.

Further, in the conventional disc changer player, an apparatus that elevates and translates a translating chassis on which a disc reproducing drive apparatus is mounted by rotation of a feed screw shaft screws a nut of the translating chassis onto the feed screw shaft. In order to prevent the translating chassis from fluctuating relative to the feed screw shaft or in order to remove a back-lash between the feed screw shaft and the nut, the nut is constantly urged toward the feed screw shaft side by a special spring.

As a result, when the translating chassis is elevated and translated, a friction resistance with a feed screw shaft is increased to cause a so-called mechanical loss to take place. There are then disadvantages in translation speed of the translating chassis and operation under such circumstances. Thus, a high torque motor is utilized as the driving source to remove such disadvantages, which unavoidably makes the disc changer player expensive.

In the conventional disc auto-changer player or the like, if an accommodating magazine for accommodating therein a disc or the like is erroneously loaded, some special tools must be prepared to eject the accommodating magazine when a driving power supply is turned off. If such special tools are not at hand, then the accommodating magazine cannot be ejected immediately, which hinders the exchange of the accommodating magazine.

OBJECTS AND SUMMARY OF THE INVENTION

Therefore, it is an object of the present invention to provide an improved disc changing apparatus for a disc player in which the aforesaid shortcomings and disadvantages encountered with the prior art can be eliminated.

More specifically, it is an object of the present invention to provide a disc changing apparatus for a disc player in which a magazine for accommodating therein a disc or the like can be ejected without providing an exclusively-designed driving power supply.

It is another object of the present invention to provide a disc changing apparatus in which a disc magazine can be loaded and ejected in association with a media selecting operation mechanism.

It is a further object of the present invention to provide a translating apparatus in which when a translating chassis is translated, only a normal feed screw shaft load is considered, while when the translating chassis is in the stop mode, the translating chassis is fixedly supported by the feed screw shaft in a ganged relation to operation of a mounted operation member.

According to a first aspect of the present invention, there is provided a disc changer player which comprises a disc loading unit into which there is loaded a disc accommodating magazine in which a plurality of discs are accommodated in a stacked condition, a translating chassis having a disc reproducing mechanism and translating in a stacking direction of the discs relative to the disc loading portion, a selecting operation member for selecting a desired disc by controlling a translation of the translating chassis, and an eject mechanism for ejecting the disc accommodating magazine from the disc loading unit, wherein the disc accommodating magazine is ejected by controlling operation of the eject mechanism by the selecting operation member.

According to a second aspect of the present invention, there is provided a translating apparatus which comprises a translating chassis having a disc reproducing operation apparatus mounted thereon, a pair of opposing chassis, a plurality of feed screws supported on the pair of fixed chassis, and a gear member through which the translating chassis is translated by a rotation of the plurality of feed screw shafts, wherein the gear member that is meshed with at least one feed screw shaft is engaged with the translating chassis so that the gear member can be meshed with the feed screw shaft and the movable gear member is translated in accordance with operation of the disc reproducing operation apparatus so as to be strongly meshed with the feed screw shaft.

The above and other objects, features and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described with reference to the drawings. In this embodiment, the present invention is applied to a disc auto changer player.

A disc auto changer player according to this embodiment includes on its one half portion a disc magazine loading unit A into which a disc accommodating magazine M is loaded. In the other half portion of the disc auto changer player is provided a disc reproducing and driving apparatus B. The disc accommodating magazine M includes a plurality of disc trays (not shown) in which there are accommodated a plurality of discs, for example, discs $D_1$ to $D_6$ in the direction shown by arrow a in FIG. 3 in a stacked condition.

The disc magazine loading unit A will be described first.

Figure 1:
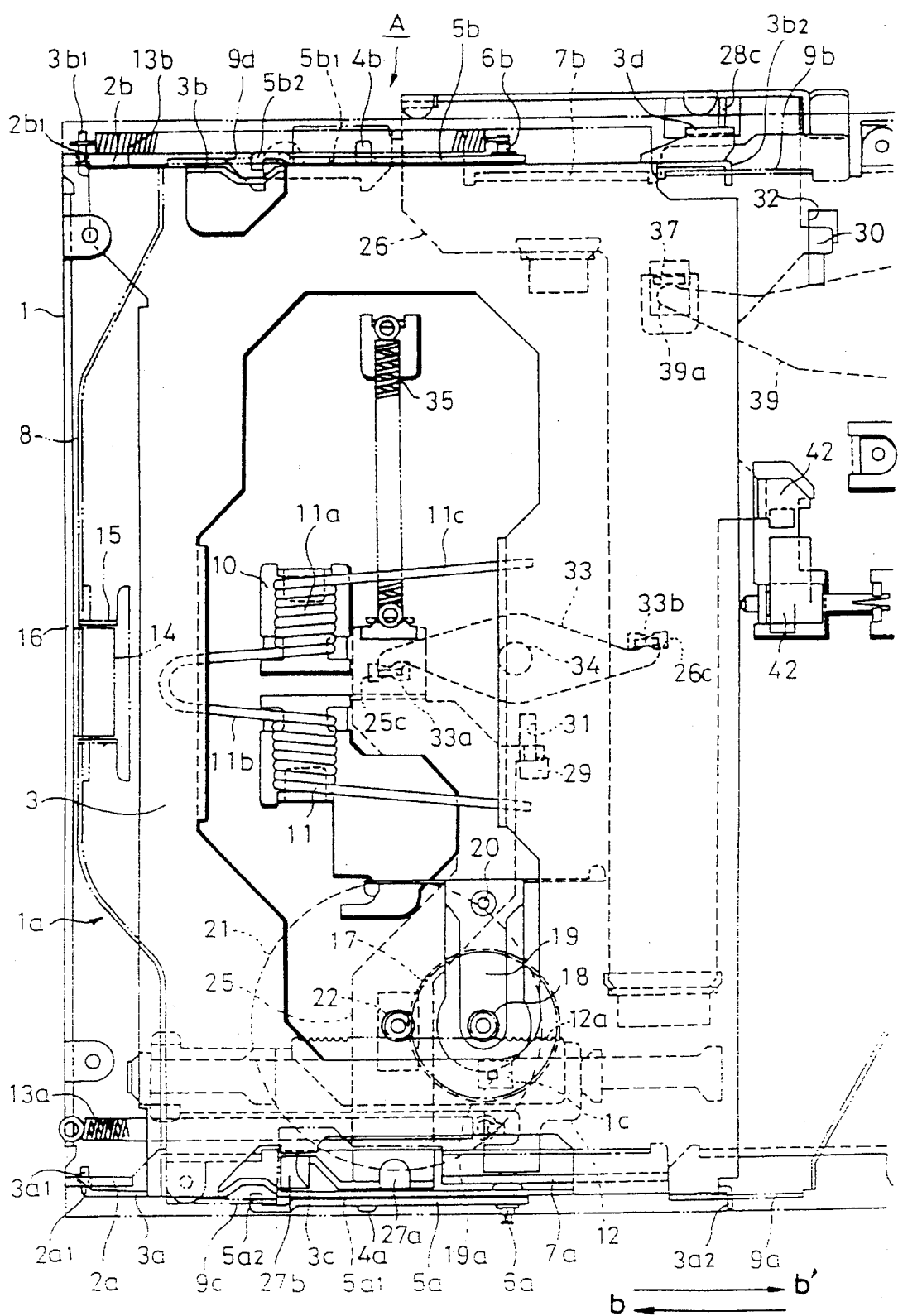
FIG. 1 is a plan view of one half portion of an embodiment of a disc auto changer player to which the present invention is applied and in which a part thereof is omitted.

As shown in FIG. 1 of the accompanying drawings, an eject frame 3 is erectably pivoted on a lower chassis 1 by loosely fitting tabs 3a1, 3b1 bent on end portions of front and rear arm portions 3a, 3b of the eject frame 3 into shaft apertures 2a1, 2b1 of supporting members 2a, 2b that are erected from side edges of one half portion 1a of the lower chassis 1.

Figure 3:
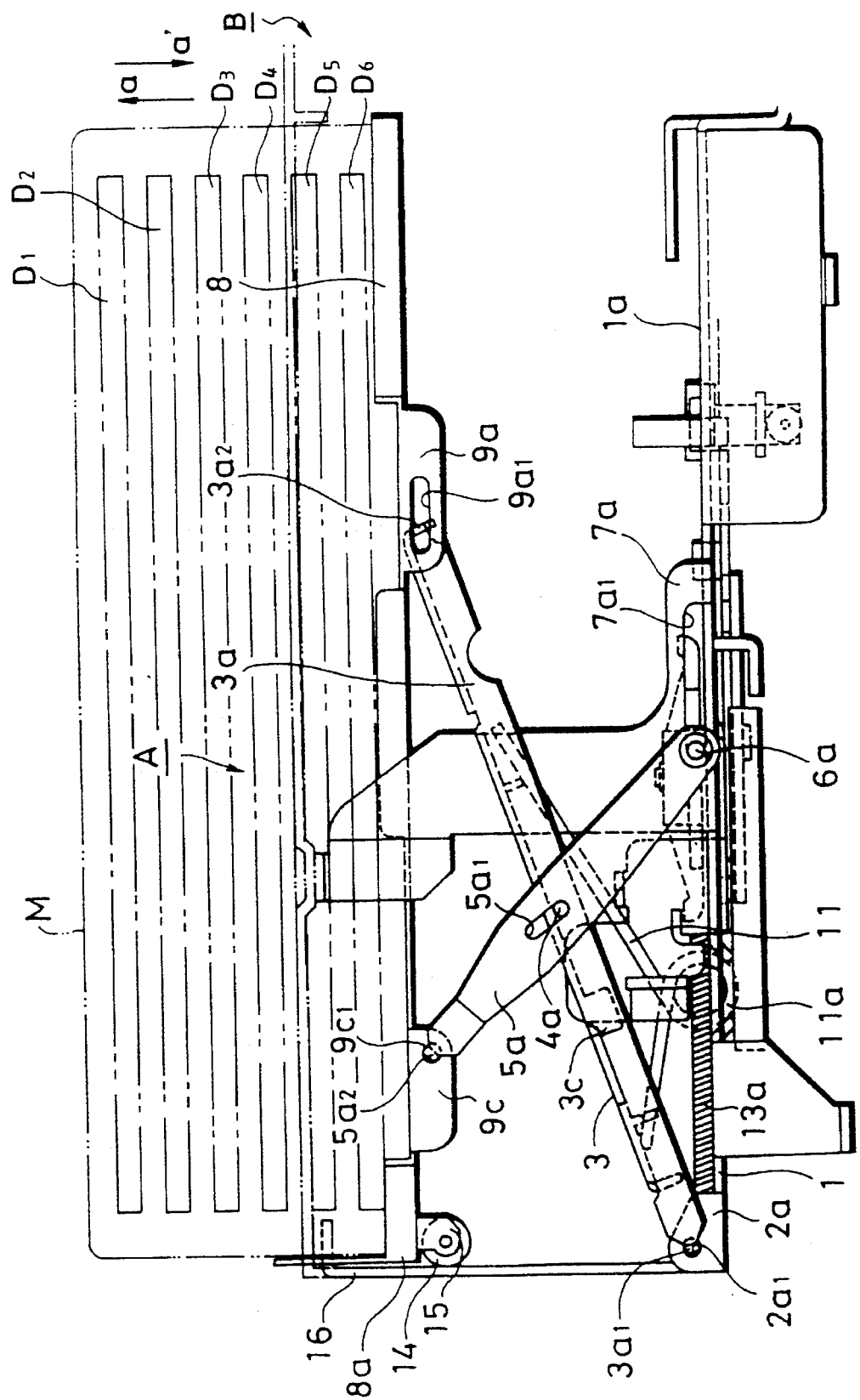
FIG. 3 is a front view of one half portion thereof.
Figure 4:
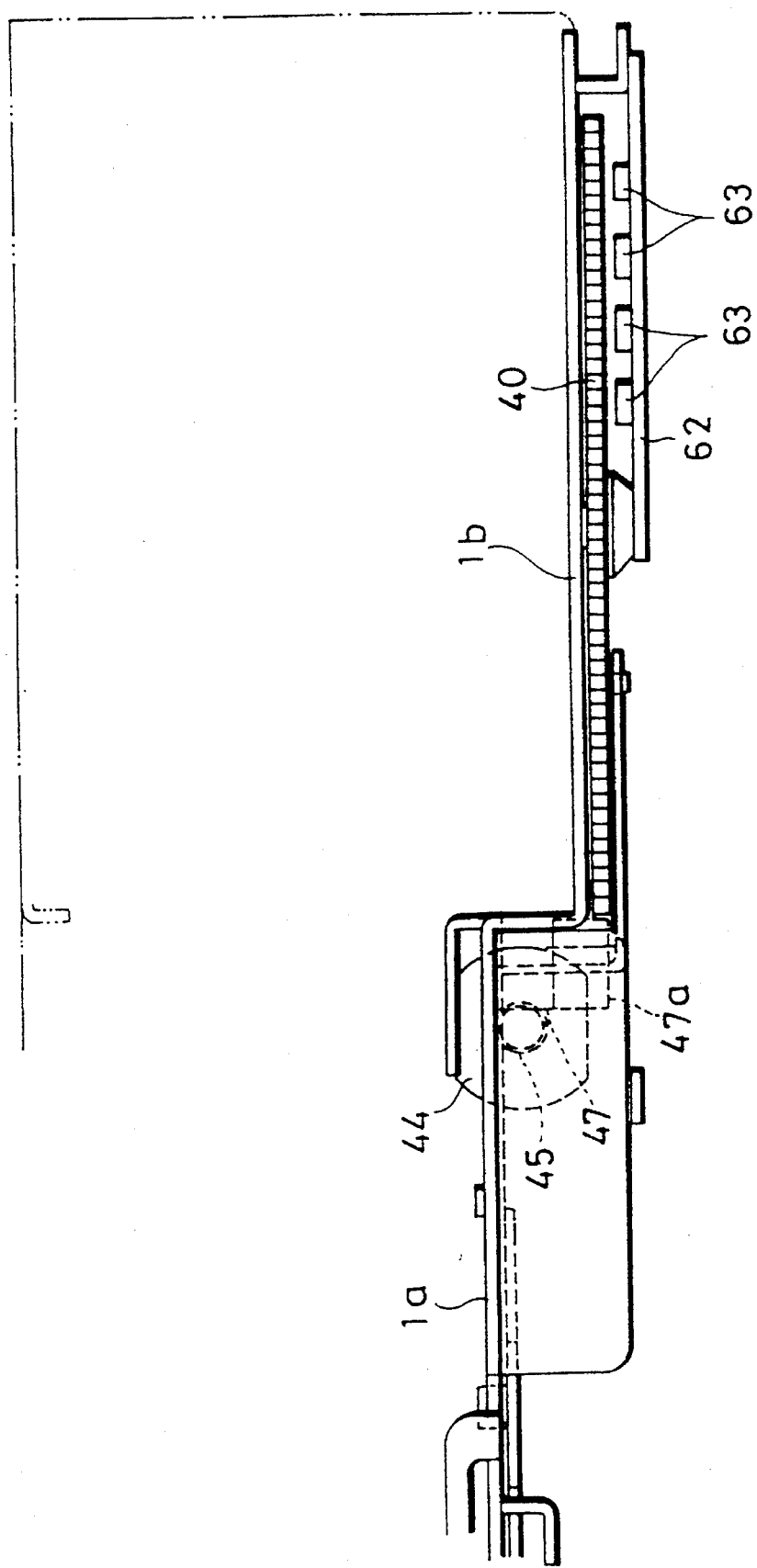
FIG. 4 is a front view of another half portion thereof.

The front and rear arm portions 3a, 3b of the eject frame 3 include shaft pins 4a, 4b secured to substantially central portions thereof by caulking treatment. Eject arms 5a, 5b are respectively engaged with the shaft pins 4a, 4b by means of elliptical apertures 5a1, 5b1 bored through substantially central portions of eject arms 5a, 5b. The eject arms 5a, 5b are supported so as to be raised and slid in the left and right direction with respect to the lower chassis 1 by engaging shaft pins 6a, 6b, secured to end portions thereof by caulking treatment, into elliptical guide apertures 7a1, 7b1 (elliptical guide aperture 7b1 is not shown because it is formed similarly to the elliptical guide aperture 7a1) formed through the lower end portions of brackets 7a, 7b erected at substantially central portions of the front and rear end edges of one half portion 1a of the lower chassis 1 under the condition that they are crossed and coupled with the front and rear arm portions 3a, 3b of the eject frame 3 as shown in FIG. 3.

Tab members 3a2, 3b2 and 5a2, 5b2 are bent on respective end portions of the front and rear arm portions 3a, 3b and the eject arms 5a, 5b of the eject frame 3 to thereby support a magazine receiving plate 8.

Supporting piece members 9a, 9b, 9c, 9d that are bent downwardly are formed at front and rear end portions of the magazine receiving plate 8 supported by the eject frame 3 and the eject arms 5a, 5b. The supporting members 9a, 9b include elliptical apertures 9a1, 9b1 bored therethrough in the right and left direction to which tab members 3a2, 3b2 of the eject frame 3 are slidably fitted. The elliptical aperture 9b1 is not shown because it is formed similarly to the elliptical aperture 9a1. The other supporting members 9c, 9d include shaft apertures 9c1, 9d1 bored therethrough to which tab members 5a2, 5b2 of the eject arms 5a, 5b are rotatably fitted. The shaft aperture 9d1 is not shown because it is formed similarly to the shaft aperture 9c1. The lower chassis 1, the eject frame 3, the eject arms 5a, 5b and the magazine receiving plate 8 constitute a so-called pantograph mechanism, whereby the magazine receiving plate 8 is supported to be elevatable with respect to the lower chassis 1.

The eject frame 3 that constructs the pantograph mechanism is constantly biased in the ejecting direction under spring force of a torsion coil spring 11. The torsion coil spring 11 includes a coil portion 11a held by engagement with a supporting portion 10 formed on the chassis 1. The respective end portions 11b, 11c of the coil spring 11 are urged against the lower surface of the eject frame 3, in which one end portion 11b is urged against the shaft supporting end portion direction and the other end portion 11c is urged against the free end portion direction.

The eject arm 5a is coupled to the half portion 1a of the lower chassis 1 by pivotally fitting the shaft pin 6a into a rack member 12 disposed so as to become slidable relative to the lower chassis 1 in the left and right directions shown by arrows b, b' in FIG. 1. Tension coil springs 13a, 13b are extended between the rack member 12 and the shaft pin of the eject arms 5a, 5b and one side end edge of the lower chassis 1, respectively whereby the two eject arms 5a, 5b are constantly biased in the upper direction. Therefore, the magazine receiving plate 8 is constantly biased in the elevating direction shown by an arrow a in FIG. 3. A roller 14 is attached to an outer side wall 8a of the magazine receiving plate 8 by means of a bracket 15. This roller 14 is brought in rotatable contact with the inner surface side of a side wall plate portion 16 erected at one side end edge of the half portion 1a of the lower chassis 1, thereby restricting the position of the magazine receiving plate 8 when the magazine plate 8 is elevated.

As shown in FIG. 1, a gear portion 12a of the rack 12 that is in engagement with the eject arm 5a is meshed with a pinion 18 which is coaxial with a gear 17 provided on the upper surface side of the lower chassis 1. The gear 17 is pivotally sandwiched between free ends of a supporting member 19 of U-letter configuration made of a plate spring member. The supporting member 19 is pivotally supported on the lower side of the chassis 1 by a shaft 20 at the portion distant from a pivot portion of the gear 17. Rotation of the supporting member 19 is restricted by the engagement between an engagement member 19a bent at the end edge of the lower free end of the supporting member 19 and a window aperture 1c bored through the lower chassis 1.

Figure 7:
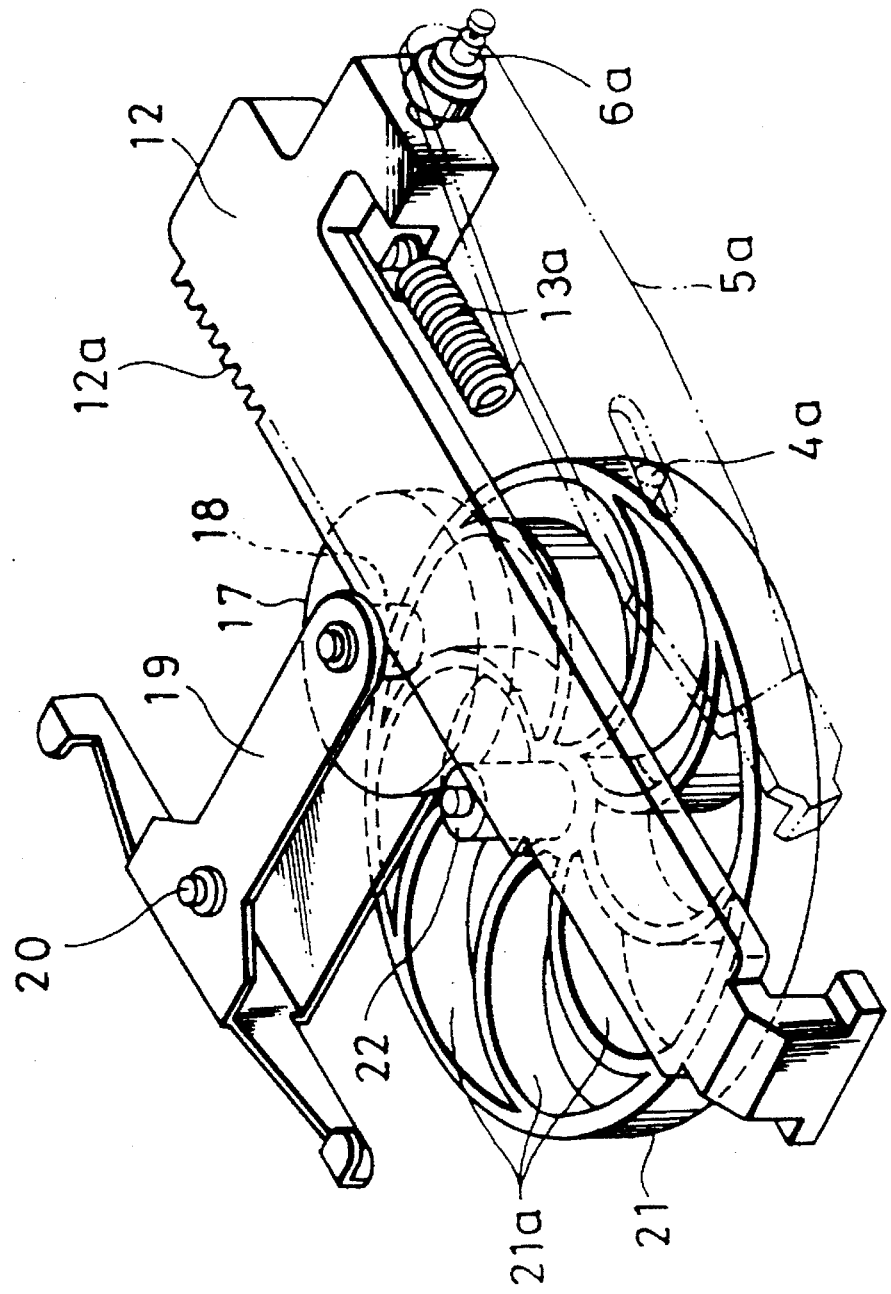
FIG. 7 is a perspective view of an eject driving mechanism.

The gear 17 supported by the supporting member 19 is operated in a ganged relation with a vane wheel 21 disposed on the lower surface side of the lower chassis 1. The vane wheel 21 includes a plurality of blades 21a which receive air resistance as shown in FIG. 7. The vane wheel 21 includes a pinion 22 integrally formed at its central shaft portion. This pinion 22 is projected onto the upper surface side of the lower chassis 1 and meshes with the gear 17.

When the rack 12 is slid by the mesh of the gear 17 with the pinion 22, the gear 17 is rotated by means of the pinion 18 and the rotation of the gear 17 is transmitted through the pinion 22 to the vane wheel 21, whereby the vane wheel 21 is rotated while encountering air resistance. When the rack member 12 is slid leftward, i.e, in the direction shown by the arrow b in FIG. 1, or when the rack member 12 is pulled by a spring-biasing force of the tension coil spring 13a so as to raise the eject arm 5a, the supporting arm 19 is rotated in the clockwise direction through the pinion 18 meshed with the rack 12 with the result that the gear 17 is meshed with the pinion 22 of the vane wheel 21. Then, while the rack member 12 keeps sliding, the vane wheel 21 is rotated and the rack member 12 is thereby slid under indirect air resistance.

When the rack member 12 is slid rightward, i.e., in the direction shown by an arrow b' in FIG. 1, or the rack member 12 is slid so as to lower the eject arm 5a against the spring-biasing force of the tension coil spring 13a, the supporting member 19 is pushed through the pinion 18 and rotated in the counter-clockwise direction in FIG. 1. Then, the gear 17 is detached from the pinion 22 of the vane wheel 21 and therefore the vane wheel 21 is not rotated so that the rack member 12 is slid without being affected by air resistance.

As shown in FIG. 1, locking members 25, 26 are disposed on the lower surface side of the half portion 1a of the lower chassis 1 so as to lock the disc magazine M under the condition that the disc magazine M is loaded.

Figure 8:
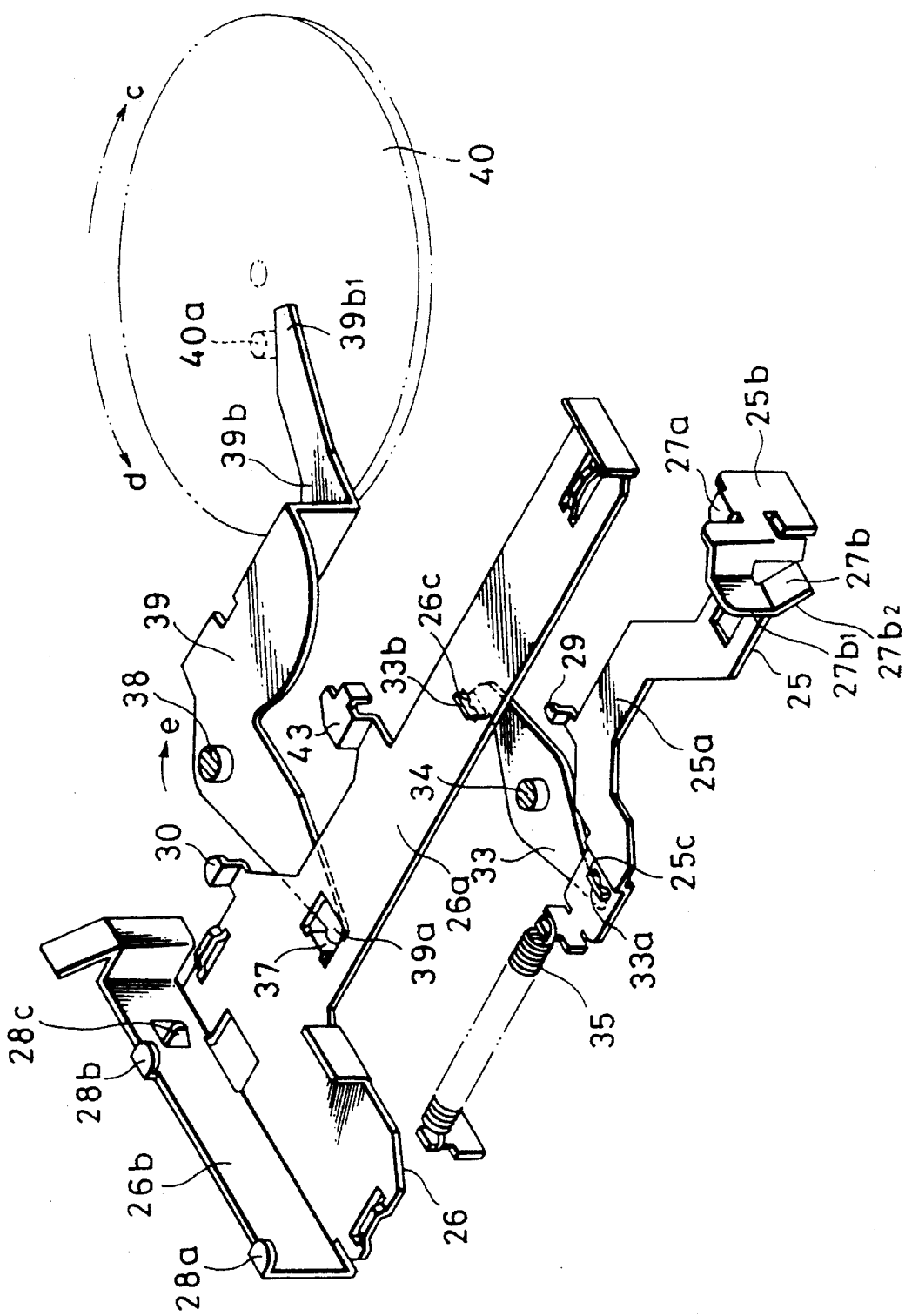
FIG. 8 is a perspective view of a locking mechanism.

The locking members 25, 26 are adapted to lock the disc magazine M by gripping the same from its front and rear direction. As shown in FIG. 8, the locking members 25, 26 comprise flat plate portions 25a, 26a located at the lower surface side of the half portion 1a of the lower chassis 1 and vertical face portions 25b, 26b that are erected in an opposing relation to the front and rear end edge sides of the lower chassis 1. One locking member 25 is disposed on the lower chassis 1 so that the vertical face portion 25b is opposed to the front end edge side of the lower chassis 1 and the other locking member 26 is disposed on the lower chassis 1 so that the vertical face portion 26b is opposed to the rear end edge side of the lower chassis 1.

The vertical face portion 25b of one locking member 25 includes at its upper end edge of one side portion one locking click 27a projected substantially horizontally toward the inside and at its the other side portion a cam portion 27b. The cam portion 27b has a vertical face 27b1 formed on its upper half portion and an inclined face 27b2 formed on its lower half portion in association with one guide portion 3c of the eject frame 3. Two locking clicks 28a, 28b are projected substantially horizontally toward the inside of the upper end edge of the vertical face portion 26b of the other locking portion 26 with a predetermined space therebetween. A cam portion 28c of an inclined projection configuration is formed on the inner surface side of the vertical face portion 26b of the other locking member 26 in association with the other guide portion 3d of the eject frame 3. The two locking members 25, 26 include on their flat face plate portions 25a, 26a formed raising engagement members 29, 30, respectively. These raising engagement members 29, 30 are engaged with engagement guide apertures 31, 32 bored through the lower chassis 1 as shown in FIG. 1. The two locking members 25, 26 are supported on the lower chassis 1 so that they can be slid in a predetermined range in the inner and outer direction. A rotary interlocking member 33 is pivoted between both the locking members 25, 26 at its center supported one the lower chassis 1 by a shaft 34. Engagement members 33a, 33b formed at respective ends of the rotary interlocking member 33 are engaged with engagement apertures 25c, 26c bored through the locking members 25, 26, respectively, whereby the two locking members 25, 26 can be slid in the inner and outer direction in a ganged relation.

The locking member 25 is constantly slid inwardly under spring force of a tension coil spring 35 extended between the inner end thereof and the lower chassis 1, whereby the other locking member 26 also is constantly slid inwardly through the rotary interlocking member 33.

As shown in FIGS. 1 and 8, the other locking member 26 includes a striking member 37 erected therefrom. The striking member 37 strikes one end 39a of a lock releasing lever 39 pivotally supported on the lower chassis 1 by a shaft 38 in the outward sliding direction of the locking member 26.

Figure 2:
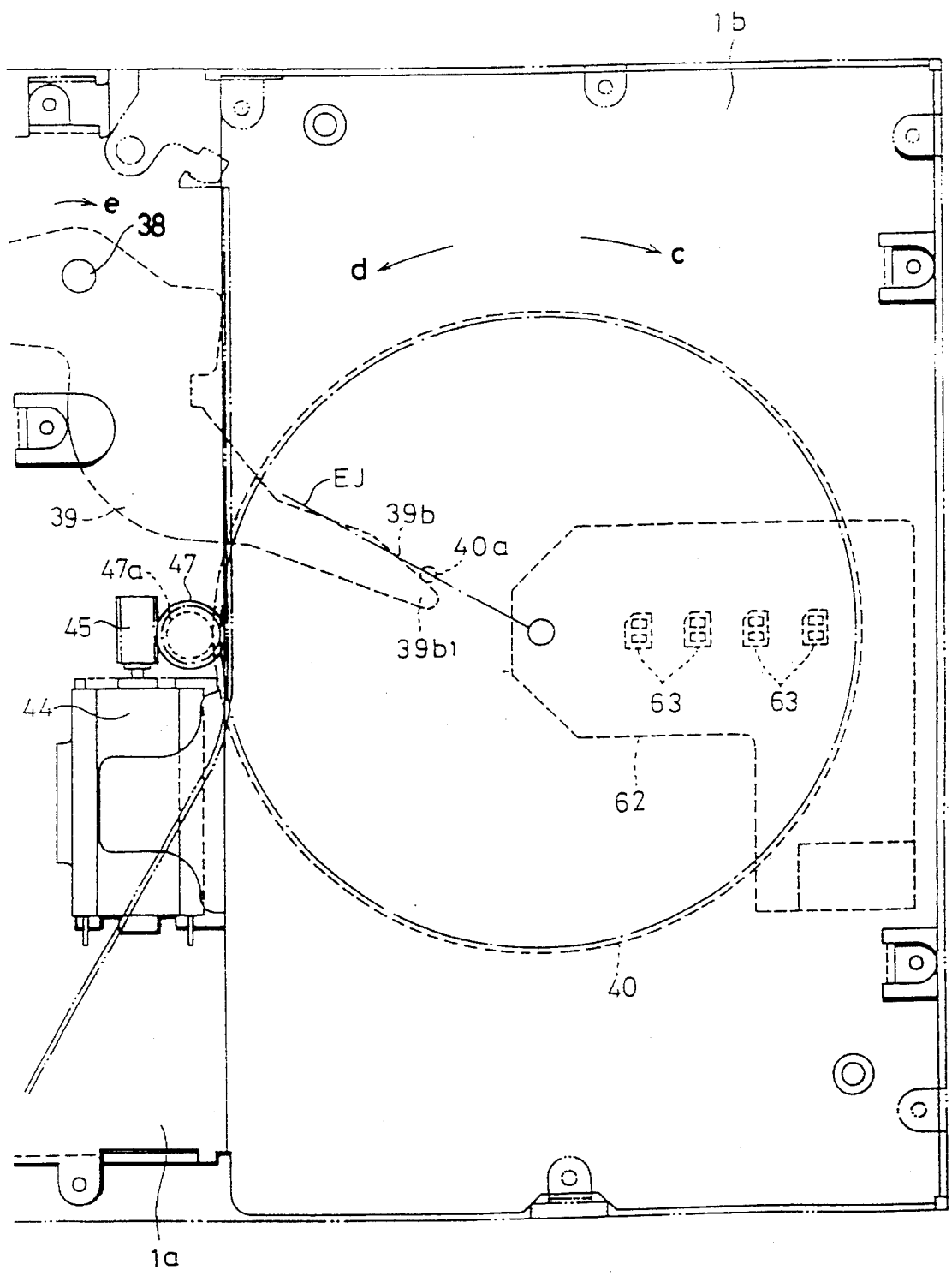
FIG. 2 is a plan view of another half portion thereof.

As shown in FIG. 2, the other end 39b of the lock releasing lever 39 is extended to the other half portion 1b of the lower chassis 1 so as to oppose the lower surface of an address detection gear 40 provided on the side of the other half portion 1b of the lower chassis 1. Another end portion 39b1 of the lock releasing lever 39 is engaged with a lock releasing pin 40a projected from an eject address EJ of the address detection gear 40.

Figure 5:
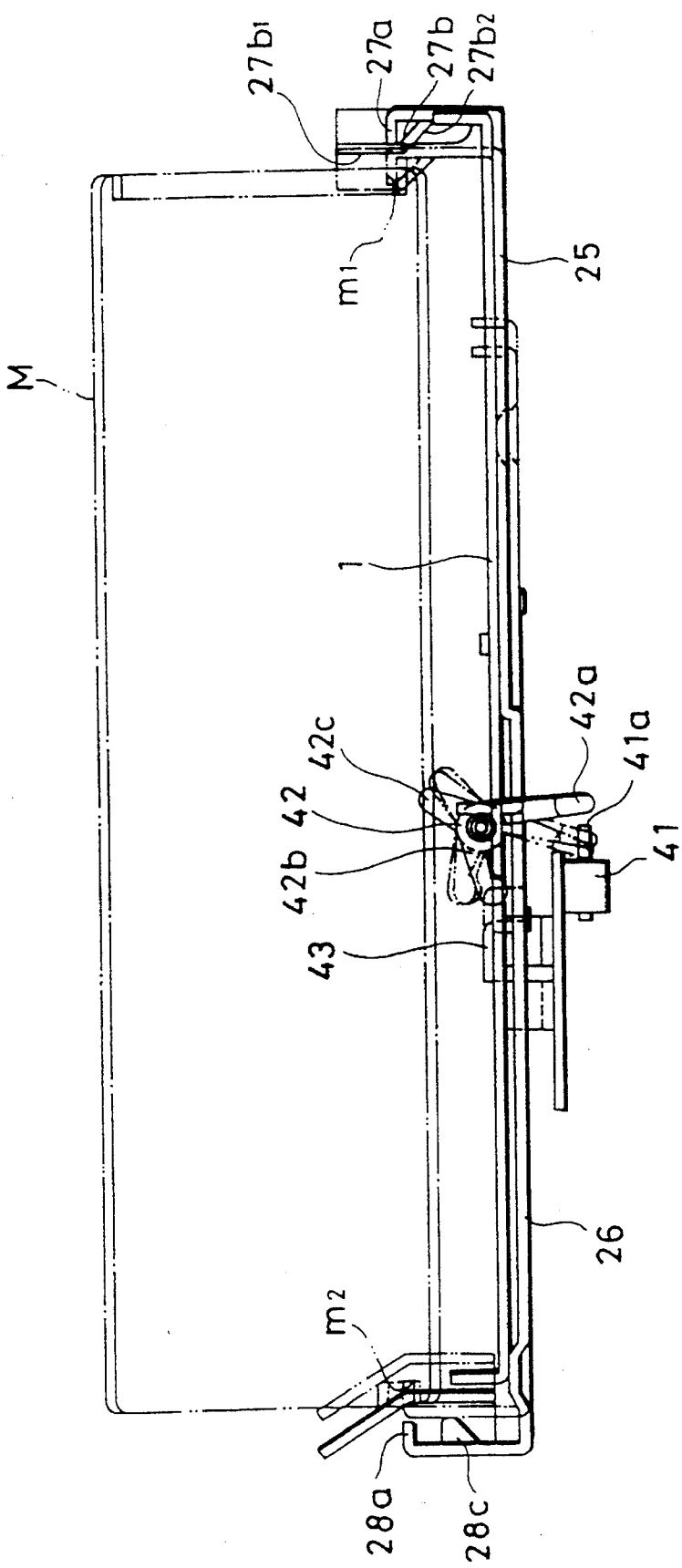
FIG. 5 is a side view used to explain operation of one half portion thereof.
Figure 6:
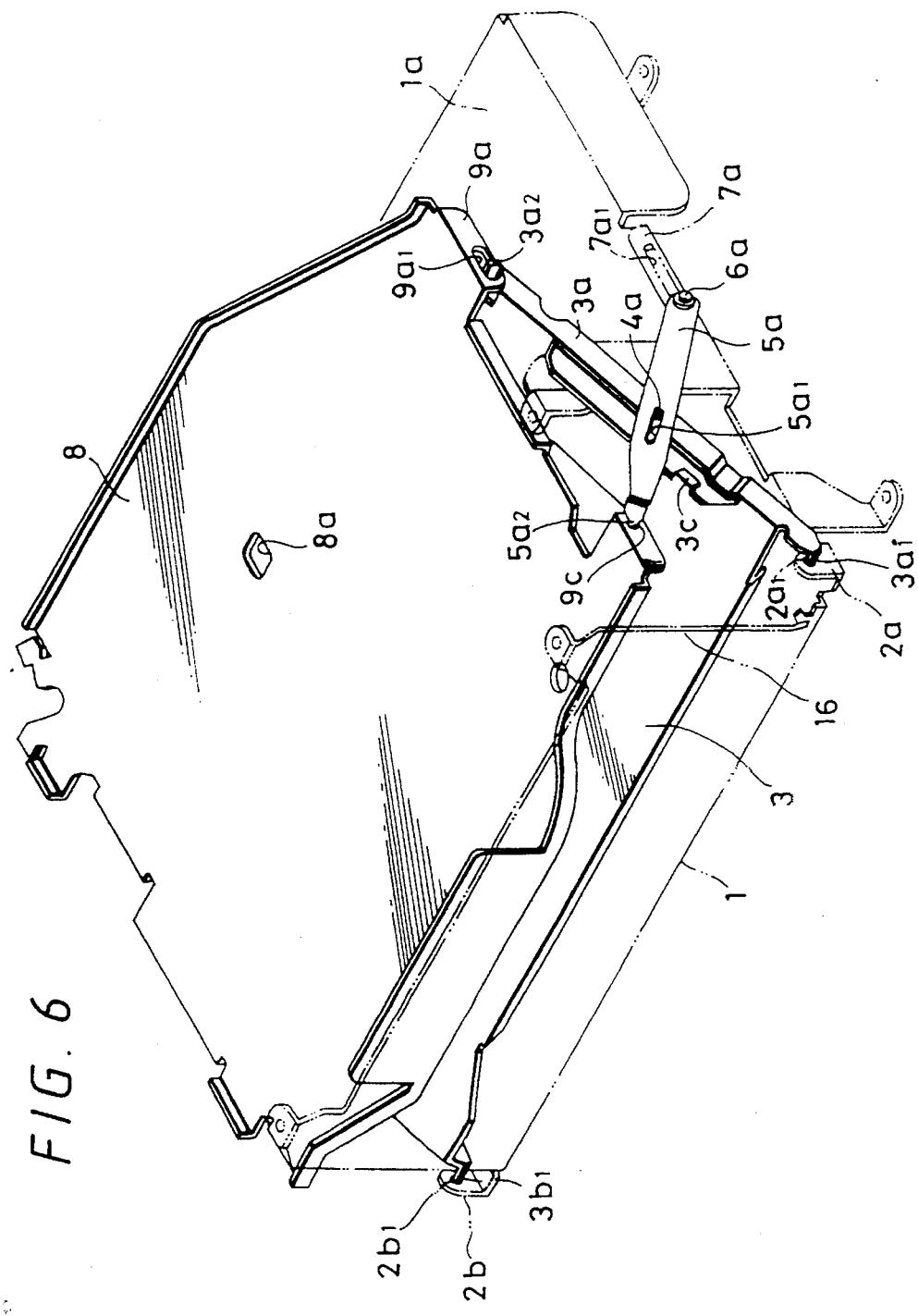
FIG. 6 is a perspective view of a magazine supporting mechanism.

As shown in FIG. 5, on the upper surface of the half portion 1a of the lower chassis 1, an operation member 42 is disposed near the other locking member 26 to operate a magazine detection switch 41. The operation member 42 comprises an operation piece member 42a corresponding to an operation member 41a of the detection switch 41, a pushing piece member 42b corresponding to a projection portion 43 formed on one side edge of flat plane portion 26a of the other locking member 26 and projected toward the upper surface of the lower chassis 1 and a detection piece member 42c projected from the window aperture 8a of the magazine receiving plate 8 to the upper surface. The operation member 42 is pivotally supported on the upper surface of the lower chassis 1. The detection switch 41 turns on and off a power supply circuit (not shown) of a motor 44 that rotates the address detection gear 40 as shown in FIG. 2. As shown in FIG. 2, a worm 45 is secured to the rotary shaft of the motor 44 and a worm gear 47 is meshed with the worm 45, whereby a rotational force is transmitted to the address detection gear 40 through the worm gear 47.

Operation of the disc magazine loading portion A thus arranged will be described below.

Under the condition that the disc magazine M is not loaded, the magazine receiving plate 8 is elevated to a predetermined height by the eject frame 3 and the eject arms 5a, 5b raised under spring force of the torsion coil spring 11 and the tension coil springs 13a, 13b.

When the address detection gear 40 is rotated, the releasing pin 40a pushes the other end portion 39b1 of the lock releasing lever 39 so that the lock releasing lever 39 is rotated. By this operation, the other locking member 26 is pushed outwardly and slid and the locking member 25 that is operated in a ganged relation with the locking member 26 also is slid outwardly against the spring force of the tension coil spring 35, whereby the locking clicks 27a, 27b and 28a, 28b of the two locking members 25, 26 are brought to the positions distant from the front and rear edges of the magazine receiving plate 8.

The disc magazine M is loaded as follows. When the disc magazine M is loaded on and then pushed into the magazine receiving plate 8, the pantograph mechanism is contracted through the magazine receiving plate 8. That is to say, the eject frame 3 and the eject arms 5a, 5b are lowered against the spring force of the torsion coil spring 11 and the tension coil springs 13a, 13b and thereby lowered together with the magazine receiving plate 8. In that case, concurrently with the sliding operation of the eject arm 5a, the rack member 12 is slid and the gear 17 is rotated through the pinion 18 in unison with the sliding operation of the rack member 12. Because the supporting member 19 is rotated about the shaft 20 through the pinion 18 in the counter-clockwise direction while the rack member 12 is slid in the direction (rightward in FIG. 1) of the eject arm 5a, the gear 17 is detached from the pinion 22 of the vane wheel 21 and becomes free from the vane wheel 21. Therefore, the rack member 12 is slid smoothly without being disturbed by air resistance while loads on the relating gears are reduced. Consequently, the eject arm 5a is lowered. Further, the relating gears are reduced in load and can be prevented from being broken.

When the disc magazine M is inserted into the lowermost portion, as shown in FIG. 5, the detection piece member 42c of the operation member 42 for the detection switch 41 is brought in contact with the bottom surface of the disc magazine M, whereby the operation member 42 is rotated to allow the operation piece member 42a to push the operation member 41a, thereby energizing the detection switch 41.

When the detection switch 41 is turned on, the power supply circuit (not shown) is energized to rotate the motor 44 in the positive direction, whereby the address detection gear 40 is rotated through the worm 45 and the worm gear 47 in the direction (clockwise direction) shown by an arrow c in FIGS. 2 and 8. As a result, the releasing pin 40a is detached from the other end portion 39b of the lock releasing lever 39.

When the releasing pin 40a is detached from the other end portion 39b of the lock releasing lever 39, the lock releasing lever 39 becomes rotatable and the locking member 26 is released from being locked. Then, the two locking members 25, 26 are inwardly slid in a ganged relation through the interlocking member 33 under spring force of the tension coil spring 35. As shown by a two-dot chain line in FIG. 5, the locking clicks 27a and 28a, 28b are inserted into concave portions m1, m2 of the lower end portions of the front and rear surfaces of the disc magazine M. Then, the lower surfaces of the concave portions m1 and m2 are brought in contact with the locking clicks 27a, 28a, 28b upwardly because the magazine receiving plate 8 is biased upwardly by the pantograph mechanism, whereby the disc magazine M is locked (condition shown from a one-dot chain line to the two-dot chain line in FIG. 5).

If the locking member 26 is slid inwardly in the above-mentioned operation, then the lifting portion 43 moves the pushing member 42b of the operation member 42 downwardly and pushes the same. Thus, the operation member 42 is rotated and the operation member piece 42a is held under the condition that the operation member piece 42a pushes the operation member 41a of the detection switch 41. Therefore, the detection switch 41 is kept in its on-state (condition shown by the two-dot chain line in FIG. 5).

In this loading operation, if the disc magazine M is released from being pushed by the user, then even when the disc magazine M is raised a little from the lowermost pushing position and then located at the locking position as set forth above, the detection switch 41 is kept in its on-state.

Under the condition that the disc magazine M is inserted into the locking position by the locking members 25, 26 when the disc magazine M is loaded as described above, the detection member 42c of the operation member 42 is not pushed substantially so that the operation member 42 is rotated little and the operation member 41a of the detection switch 41 is pushed little by the operation piece member 42a. Thus, the detection switch 41 is not turned on. Further, when the disc magazine M is inserted more, or when the disc magazine M is inserted by an amount corresponding to an over-stroke, the detection member 42c is pushed and hence the operation member 42 is rotated much. Consequently, the operation piece member 42a pushes the operation member 41a to turn the detection switch 41 on.

According to the above-mentioned arrangement, the disc magazine M can be mechanically locked by properly selecting a so-called mechanical control software.

Under the condition that the magazine receiving plate 8 is in the elevated state (ejected state), in the aforementioned operation, the address detection gear 40 is stopped at the position at which the releasing pin 40a is held at the eject address EJ to thereby place the lock releasing lever 39 in the lock released state of the locking members 25, 26. According to the mechanical lock system, after the address detection gear 40 was rotated in the eject direction (rotated in the direction shown by an arrow d in FIG. 8), it is confirmed that the detection switch 41 is turned off. Then, the address detection gear 40 is rotated in the direction shown by an arrow c in FIG. 8 to thereby move and hold the releasing pin 40a at a predetermined position distant from the other end portion 39b1 of the lock releasing lever 39.

In that case, since the address detection gear 40 is rotated in the eject direction to rotate the lock releasing lever 39, causing the locking members 25, 26 to slide so that the disc magazine M is temporarily released from being locked by the locking clicks 27a, 28a, 28b, the eject frame 3 is lifted and raised by the torsion coil spring 11 and indirectly the tension coil springs 13a, 13b, thereby the magazine receiving plate 8 being raised.

At that time, since the guide portions 3c and 3d of the eject frame 3 are continuously brought in contact with the cam portions 27b, 28c of the locking members 25, 26 and then moved along the cam surfaces thereof, the locking members 25, 26 are slid outwardly against the spring-biasing force of the tension coil spring 35, allowing the disc magazine M to be placed in the eject state in which the locking clicks 27a, 28a, 28b are detached from the concave portions m1 and m2 of the disc magazine M.

Under this condition, the locking members 25, 26 are restricted in position and then held under the condition that the guide portion 3c of the eject frame 3 is finally brought in contact with the upper end vertical face 27b1 of the cam portion 27b of the locking member 25 and then slid outwardly. Therefore, the magazine receiving plate 8 is held at the elevated position so that the magazine M can be loaded again.

Under this condition, the disc magazine M is loaded as follows. If the disc magazine M is held on the magazine receiving plate 8 and then inserted, then the eject frame 3 is lowered against the spring-biasing force of the torsion coil spring 11 and the tension coil springs 13a, 13b under reverse condition. In this initial state, the locking members 25, 26 are slid outwardly and then held. That is, while the other guide portion 3d is continuously brought in contact with the cam portion 28c of the locking member 26 after one guide portion 3c had been brought in contact with the cam portion 27b of one locking member 25, the locking members 25, 26 are not slid inwardly and are therefore in an engagement state.

When the eject frame is further lowered so that the guide portions 3c, 3d are detached from the cam portions 27b, 28c of the locking members 25, 26, the locking members 25, 26 are released from being locked by the lock releasing lever 39 and put in the rotatable state. Thus, the locking members 25, 26 are inwardly slid by the spring-biasing force of the tension coil spring 35, whereby the locking clicks 27a, 28a, 28b are inserted into and engaged with the concave portions m1 and m2 of the disc magazine M. Consequently, the disc magazine M is locked and loaded under the condition that it is inserted thereinto together with the magazine receiving plate 8.

If any one of the locking clicks 27a, 28a, 28b of the locking members 25, 26 is not inserted into the corresponding concave portion of the disc magazine M, the two locking members 25, 26 are restricted in operation by the rotary interlocking member 33 and hence the disc magazine M is not locked by the locking members 25, 26. That is to say, if the disc magazine M is not inserted by the over-stroke amount, it is not locked completely.

This operation can prevent the disc magazine M from being loaded incorrectly and prevent the disc magazine M from being unremovable when the disc magazine M is locked electrically. Also, this operation can prevent the locking clicks from being broken when the disc magazine M is inserted by force.

In order to eject the disc magazine M thus loaded, if the address detection gear 40 is rotated by an eject operation signal to move the releasing pin 40a in the eject address EJ direction (in the direction shown by the arrow d), then the releasing pin 40a is brought in contact with the other end portion 39b of the lock releasing lever 39 and pushes the same.

By this operation, the lock releasing lever 39 is rotated about the pivot portion 38 in the direction shown by an arrow e in FIG. 8 (clockwise direction in FIG. 8), whereby the locking member 26 is pushed outwardly by the one end portion 39a. Consequently, the locking member 25 also is pushed outwardly through the rotary interlocking member 33, whereby the two locking members 25, 26 are slid outwardly against the spring-biasing force of the tension coil spring 35. Therefore, the locking clicks 27a, 28a, 28b are disengaged from the concave portions m1 and m2 of the disc magazine M, and the disc magazine M is released from being locked.

Since the disc magazine M is released from being locked, the eject frame 3 and the eject arms 5a, 5b are lifted up under spring force of the torsion coil spring 11 and the tension coil springs 13a, 13b, whereby the magazine receiving plate 8 is raised to eject the disc magazine M.

In this eject operation, the rack member 12 is pulled and then slid under spring force of the tension coil spring 13a, whereby the eject arm 5a is raised and slid. At that time, since the rack member 12 is slid as described above, the pinion 18 of the gear 17 meshed with the rack member 12 is rotated by a friction mechanism (not shown) in one direction (clockwise direction in the figure) together with the arm portions 19a, 19b of the supporting member 19, whereby the gear 17 becomes meshed with the pinion 22 of the vane wheel 21. Then, since the rack member 12 keeps sliding, the gear 17 is rotated through the pinion 18 and the vane wheel 21 is rotated in accordance with the rotation of the gear 17.

The vane wheel 21 receives at its blades 21a the air resistance to brake the sliding of the rack member 12 in substantially inverse proportion to the rotational speed, whereby the eject arm 5a is raised slowly. Concurrently therewith, the eject frame 3 and the other eject arm 5b also are raised slowly so that the disc magazine M is ejected softly.

While the disc magazine M is softly ejected by utilizing air resistance applied to the vane wheel 21 as described above, the present invention is not limited thereto and the disc magazine M may be softly ejected by effectively utilizing viscosity resistance of oil or the like, magnetic force resistance or friction resistance or the like instead of the air resistance.

A translating mechanism for selectively translating the disc reproducing and driving apparatus B disposed on the other half portion 1b of the lower chassis 1 in correspondence with the disc magazine loading unit A thus arranged to the disc magazine loading unit A will be described with reference to FIG. 9.

Figure 9:
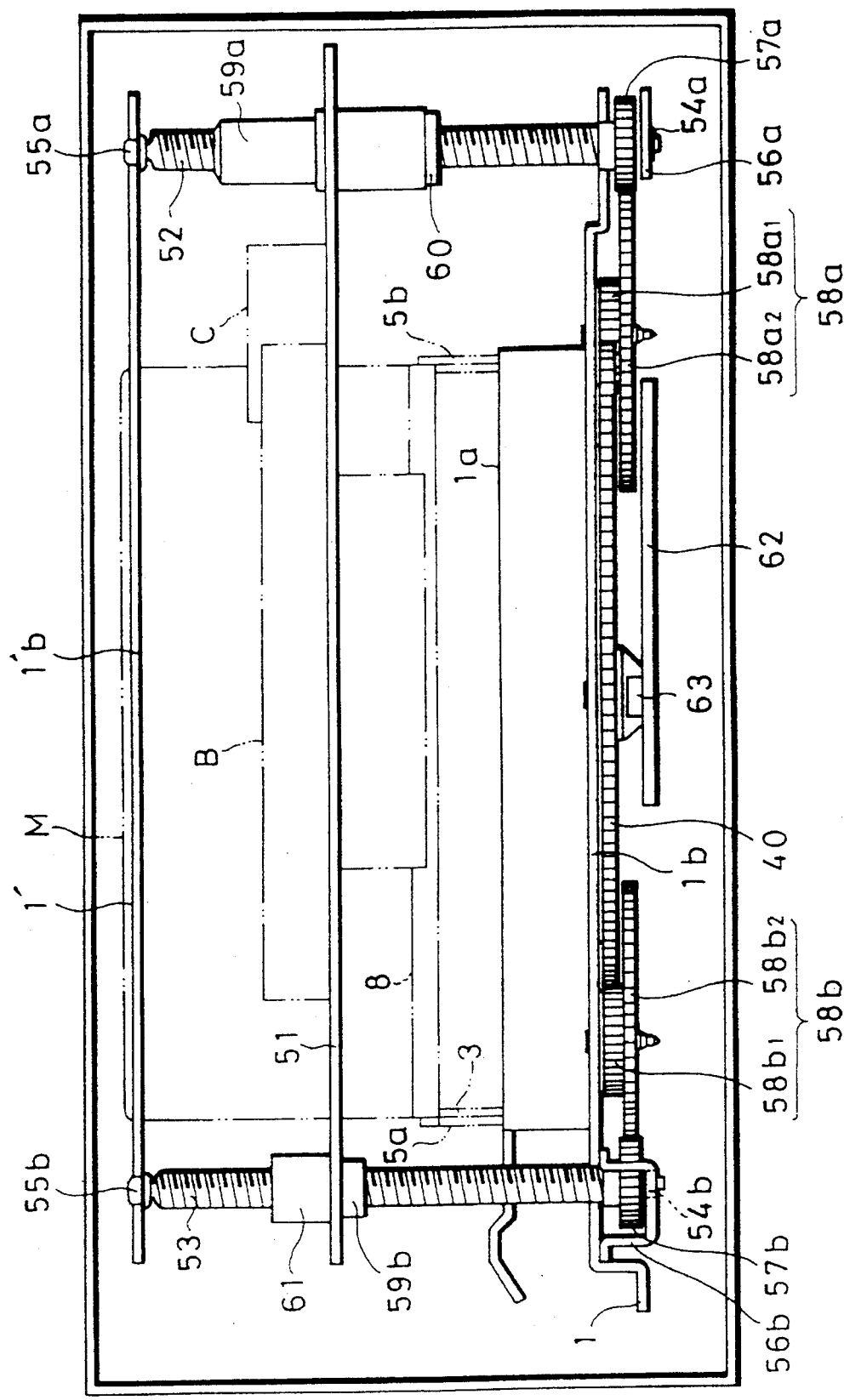
FIG. 9 is a side view of a disc reproducing and driving mechanism unit.

As shown in FIG. 9, in the translating mechanism for translating the disc reproducing and driving apparatus B, a translating chassis 51 on which the disc reproducing and driving apparatus B comprising the disc rotating mechanism and the optical pickup mechanism is mounted is attached to the other half portion 1b of the lower chassis 1 by two feed screws 52, 53 so that the translating chassis 51 can be translated with respect to the disc magazine loading portion A of the one half portion 1a of the lower chassis 1 in the disc stacking direction (direction shown by arrows a and a' in FIG. 3).

As shown in FIG. 9, bearings 54a, 54b and 55a, 55b are provided at front and rear portions of the diagonal line directions of the half portions 1b, 1b' of the upper chassis 1' and the opposing lower chassis 1 to pivotally support the feed screws 52, 53. With respect to the bearing structure of the bearings 54, 54b, 55a, 55b, the bearings 54a, 54b on the base or lower chassis 1 are formed as radial bearings, and the bearings 55a, 55b on the upper chassis 1' are formed as thrust bearings. The radial bearings 54a, 54b are attached to the lower chassis 1 by means of brackets 56a, 56b, whereby the feed screws 52, 53 are restricted in thrust operation.

Gears 57a, 57b are coaxially fixed to the feed screws 52, 53 at their end portions of the lower chassis 1 by pressure, whereby a driving force from a driving mechanism provided on the lower chassis 1 is transmitted to the two gears 57a, 57b. That is to say, a rotational force is transmitted to the gears 57a, 57b from intermediate gears 58a, 58b meshed with the address detection gear 40 that is rotated by the aforesaid motor 44 to rotate the feed screws 52, 53 in the positive or opposite direction, thereby translating the translating chassis 51.

Bearings 59a, 59b are fixed to the translating chassis 51 in association with the feed screws 52, 53. The bearing 59a of cylindrical shape fixedly penetrates the translating chassis 51, is fixed thereto and to which a nut 60 that is fitted into the feed screw 52 engaged thereto with pressure. The other bearing 59b is fixed to the lower surface of the translating chassis 51 and has a half nut 61 formed on the upper surface of the translating chassis 51 in an opposing relation to the bearing 59b. The half nut 61 is meshed with the feed screw 53. The translating chassis 51 is restricted in position with respect to the feed screws 52 and 53 by the nut 60 and the half nut 61.

The translating chassis 51 includes a conveying mechanism C for conveying a disc back and forth between the disc magazine loading portion A and the disc reproducing and driving apparatus B.

A driving mechanism that moves the translating chassis 51 on which the disc reproducing and driving apparatus B is mounted in the disc stacking direction of the disc magazine loading unit A will be described below.

The driving source for the driving mechanism comprises the worm 45 pivotally attached to the rotary shaft of the motor 44, the worm wheel 47 meshed with the worm 45 and a spur gear 47a coaxial with the worm wheel 47 (see FIG. 2).

As shown in FIG. 9, the spur gear 47a provided at the final stage of the driving source is meshed with the address detection gear 40, and small gear portions 58a1, 58b1 of a pair of intermediate gears 58a, 58b are meshed with the address detection gear 40. Large gear portions 58a2, 58b2 of the intermediate gears 58a, 58b are respectively meshed with the gears 57a, 57b which are fitted into the feed screws 52, 53 with pressure, whereby a rotational force of the driving source is transmitted to the gears 57a, 57b to rotate the feed screws 52, 53.

By the rotation of the feed screws 52, 53, the translating chassis 51 is translated through the nut 60 and the half nut 61 of the bearings 59a, 59b in the axial direction of the feed screws 52, 53, i.e., the disc stacking direction of the disc magazine loading unit A (in the direction shown by the arrows a and a' in FIG. 3).

When the translating chassis 51 is translated to the designated position, a desired disc is taken out from the disc magazine loading unit A and translated to the disc reproducing and driving apparatus B side by the operation of the conveying mechanism C so that the desired disc is reproduced.

The position detection and translating of the translating chassis 51 are carried out by operating the motor 44 under the control of a microcomputer in view of a relationship between the address detection gear 40 and a sensor.

To this end, as shown in FIG. 2, a detected portion is disposed at the rear surface of the address detection gear 40 and in association therewith, sensors 63 are disposed on a sensor base plate 62 attached to the lower chassis 1. The motor 44 is controlled by an output signal from the sensors 63.

Figure 10:
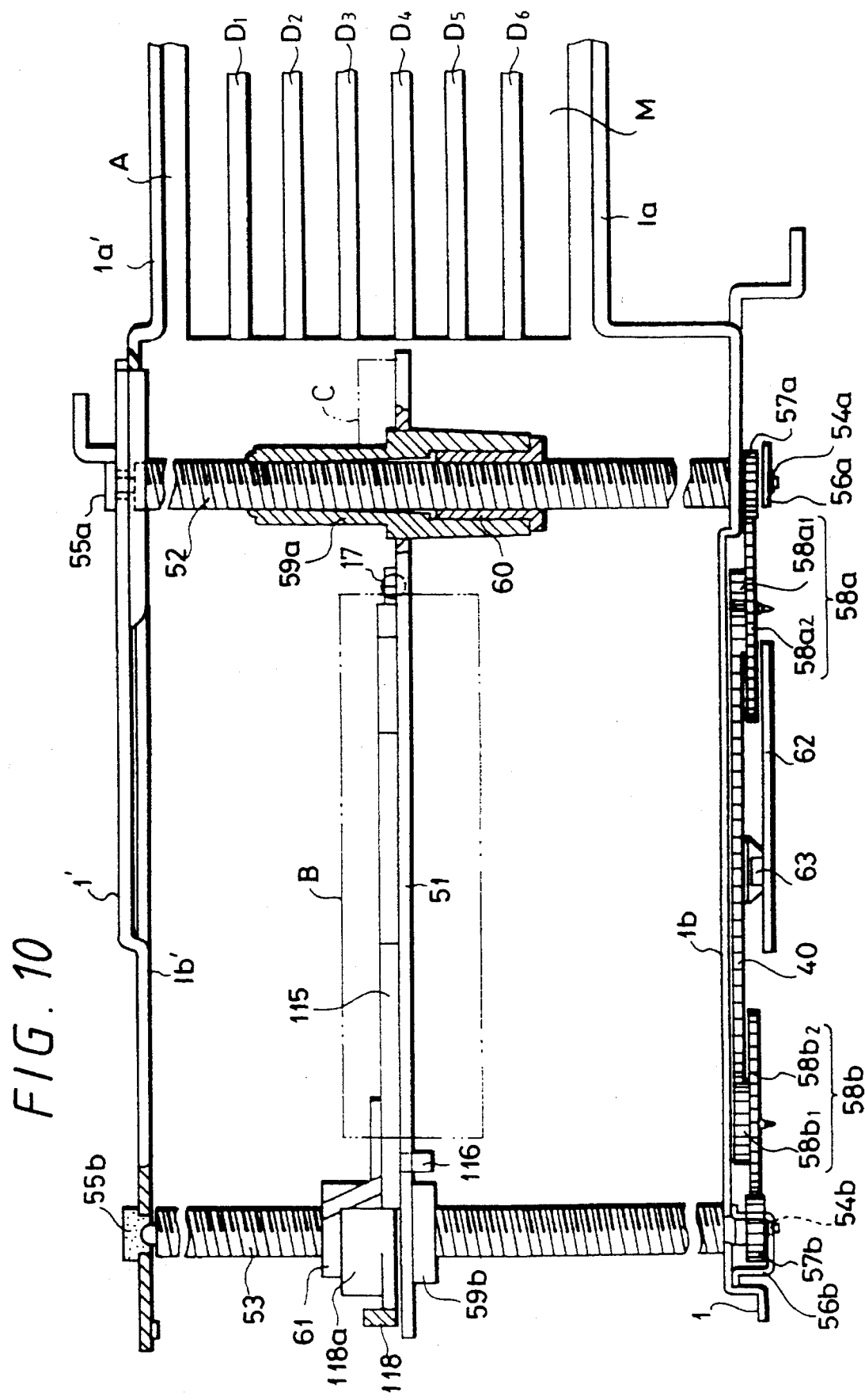
FIG. 10 is a side view of a translating mechanism used in the disc changing apparatus of the present invention.

A second embodiment of the disc driving and reproducing apparatus B mounted on the translating chassis 51 according to the present invention will be described with reference to FIGS. 10 to 12. Like elements and parts corresponding to those of the first embodiment are marked with the same references.

Figure 11:
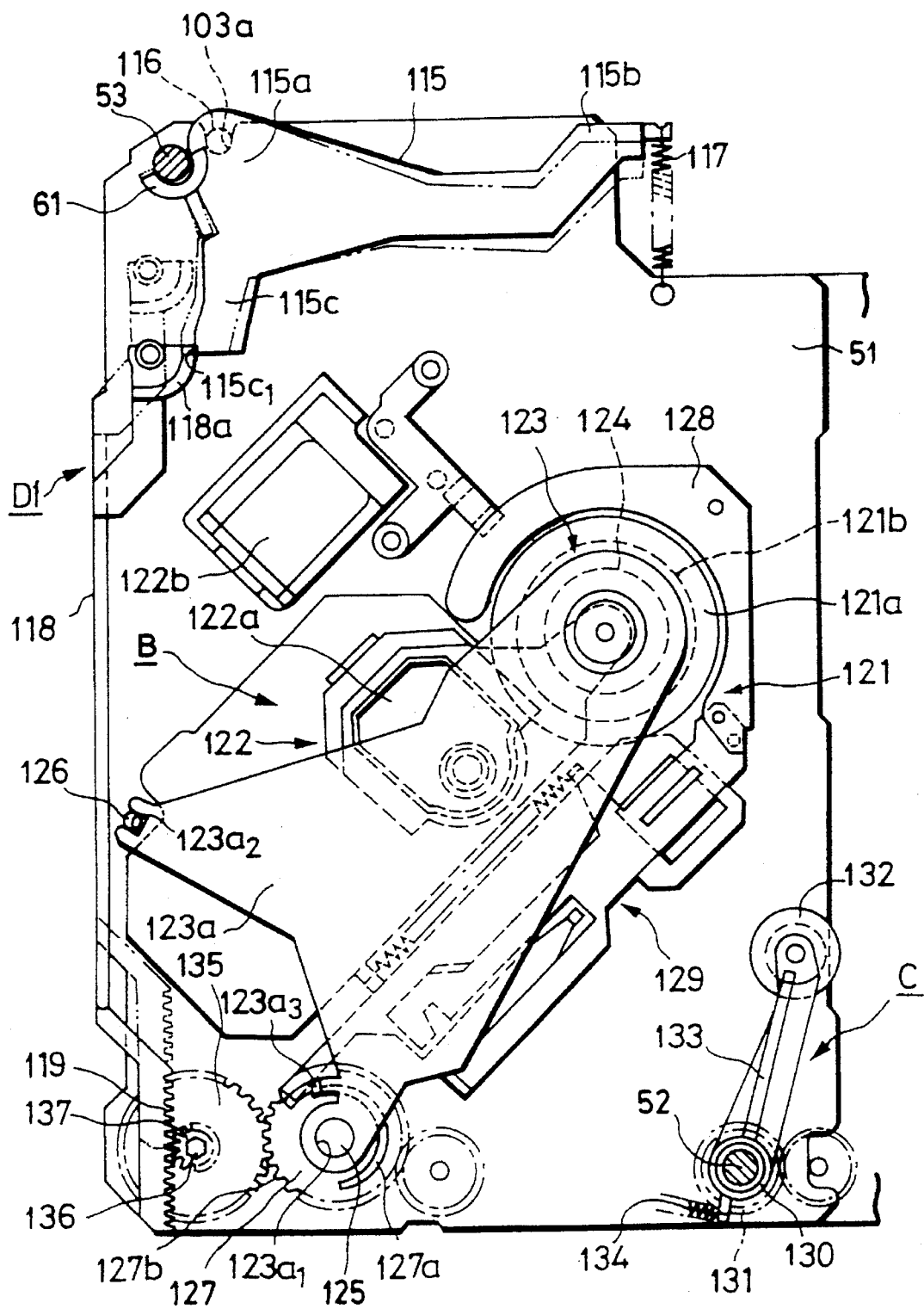
FIG. 11 is a plan view of a main portion of the translating apparatus.
Figure 12:
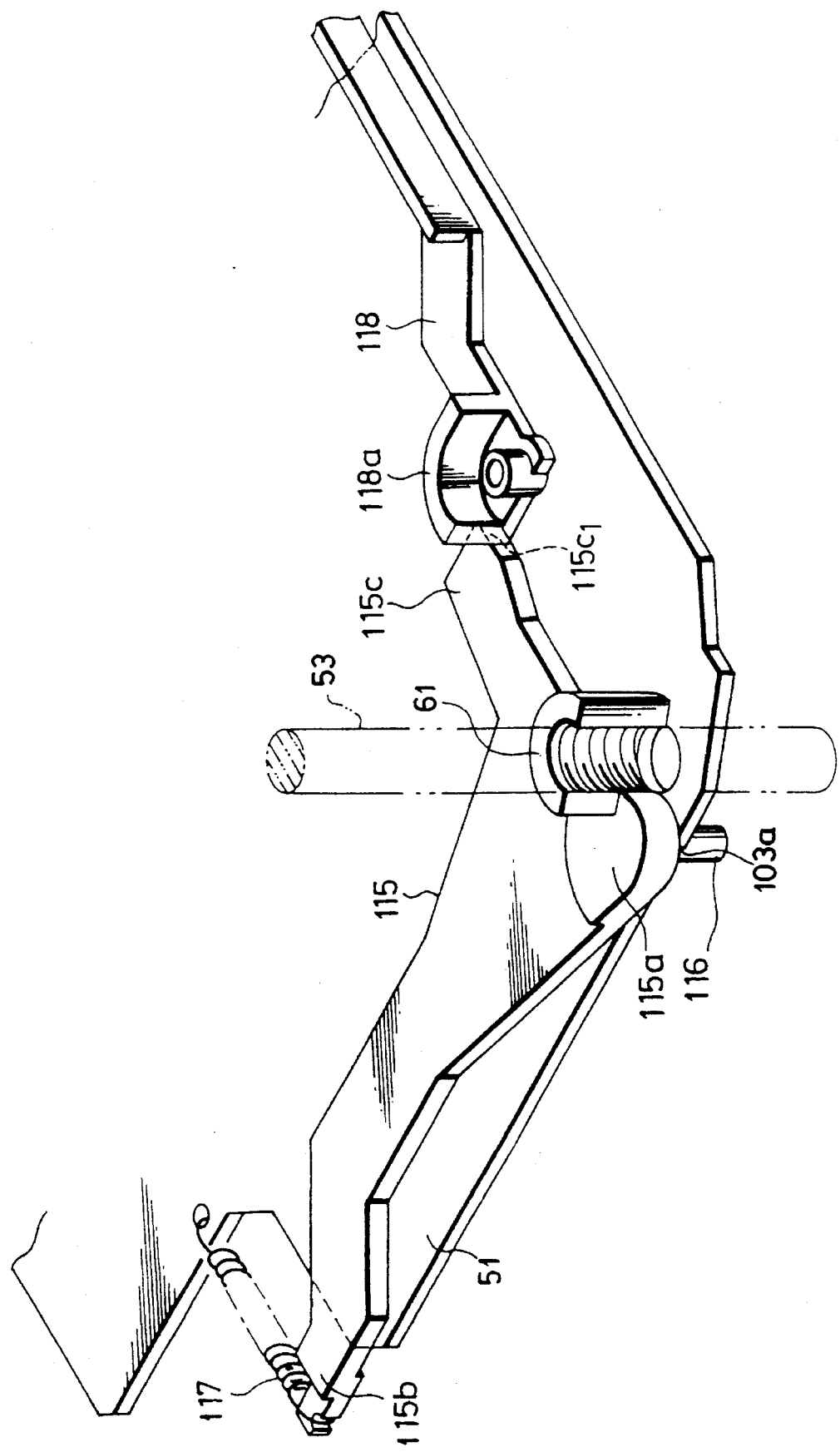
FIG. 12 is a perspective view of a main portion of the translating apparatus according to the present invention.

As shown in FIG. 11, the disc driving and reproducing apparatus B that is mounted on the translating chassis 51 translated relative to the disc magazine loading unit A comprises a disc rotating mechanism 121 for supporting and rotating the disc, an optical reading mechanism 122 and a chucking mechanism 123 for chucking the disc onto a turntable 121a of the disc rotating mechanism 121.

The disc rotating mechanism 121 comprises the turntable 121a and a spindle motor 121b. The optical reading mechanism 122 comprises an optical pickup 122a, a translating member having a sled motor 122b and a control circuit substrate on which a control circuit for controlling the translating member is mounted.

The chucking mechanism 123 comprises a chucking arm plate 123a and a magnet type chucking member 124 corresponding to the turntable 121a and attached to the top portion of the chucking arm plate 123a. The chucking arm plate 123a includes a shaft aperture 123a1 bored through a base end portion thereof. The shaft aperture 123a1 is loosely fitted on a supporting shaft 125 implanted on the translating chassis 51 so that the shaft aperture 123a1 can be slid in the axial direction of the supporting shaft 125. Further, at the portion distant from the aperture shaft 123a1 and on the plate 123, there is provided an engagement portion 123a3 which is brought in slidable contact with a cam surface 127a of a cam gear 127 pivotally supported by the supporting shaft 125. A gear portion 127b of the cam gear 127 is formed as a geneva-stop gear and a cylindrical cam portion is formed around the cam surface 127a.

In the thus formed chucking mechanism 123, the chucking arm plate 123a is moved along the cam surface 127a through the engagement portion 123a3 by the rotation of the cam gear 127, i.e., the chucking plate 123a is moved substantially parallel to the disc driving and reproducing unit B close thereto or apart therefrom with a predetermined distance therefrom, whereby the chucking member 124 is moved toward or away from the turntable 121a.

The chucking plate arm 123a is biased with a pressure by a pushing member toward the disc driving and reproducing apparatus B side in such a manner that the engagement portion 123a3 is constantly urged against the cam surface 127a of the cam gear 127.

A disc pushing member 128 of substantially horse-shoe configuration is disposed around the turntable 121a of the disc rotating mechanism 121. The disc pushing member 128 is translated by a driving member 129, which is driven by the rotation of the cam gear 127, in the axial direction of the turntable 121a and holds the disc D in cooperation with the chucking member 124 of the chucking arm plate 123a to thereby move the disc D in contact with or away from the turntable 121a. The disc pushing member 128 is constantly biased in the rearward, i.e., in the rear surface direction of the turntable 121a.

According to the disc conveying mechanism C, a disc withdrawing drive gear 131 is fitted on a shaft cylinder 130 fitted on the feed screw 52 of the feed screws 52, 53. Also, a hold arm 133 having a hold pulley 132 pivoted at the top thereof is pivotally provided and rotatably biased toward the disc magazine loading unit A by a tension coil spring 134. When a tray (not shown) provided in the disc magazine M is withdrawn, the peripheral edge of the disc D within the tray is brought in contact with the hold pulley 132, whereby the disc D is pushed into and held within the tray. Therefore, when the tray is pulled out, the hold arm 133 is rotated against the spring-biasing force of the tension coil spring 134, whereby the disc D is translated toward the disc reproducing and driving apparatus B together with the tray.

A driving transmission gear 135 is meshed with the cam gear 127 of the thus arranged reproducing and driving apparatus B. The driving transmission gear 135 is pivoted on the translating chassis 51 and engaged with a prism-shaped shaft 136 of polygon, for example, hexagon cross section in the circumferential direction which penetrates the translating chassis 51 and supported between the lower chassis 1b and the upper chassis 1b' so that the driving transmission gear 135 can be slid in the axial direction.

The prism-shaped shaft 136 is rotated when the driving transmission gear 135 is rotated by the cam gear 127. A pinion gear 137 is rotated together with the prism-shaped shaft 136 to drive an operation mechanism $D_1$, which will be described later, that moves the aforesaid half nut 61.

As shown in FIG. 11, the half nut 61 is formed on an outer corner portion 115a of a substantially L-shaped half nut lever 115. The half nut lever 115 is pivotally supported on the translating chassis 51 by engaging a shaft pin 116, implanted near the half nut 61, into a recess-shaped bearing portion 103a formed through the side edge of the translating chassis 51. The half nut lever 115 is rotatably spring-biased in one direction (clockwise direction in FIG. 11) by a tension coil spring 117 extended between one end portion 115b of the half nut lever 115 and the translating chassis 51 such that the half nut 61 is constantly meshed with the feed screw 53.

The translating chassis 51 includes on the other side edge portion thereof, i.e., on the side edge portion thereof opposing the other end portion 115c of the half nut lever 115 a movable cam lever 118 which constructs the operation mechanism $D_1$ together with the half nut lever 115 such that the cam lever 118 can be reciprocally moved in the direction of the half nut lever 115. As shown in FIG. 11, the cam lever 118 includes on one end portion thereof formed a cam portion 118a which comes in contact with an outer side end 115c1 of the other end portion 115c of the half nut lever 115. The cam lever 118 includes on the other end portion thereof a rack 119 which is meshed with the pinion gear 137 that is rotated by a rotational driving force of a chucking drive motor (not shown) of the disc chucking mechanism 123. Therefore, the rack 119 is moved in accordance with the rotation of the pinion gear 137, whereby the cam portion 118a is brought in contact with or is separated from the outer side end 115c1 of the other end portion 115c of the half nut lever 115.

Under the condition that the pinion gear 137 that is operated in synchronism with the chucking operation is rotated to the chucking releasing position, the cam portion 118a of the cam lever 118 is moved to the position at which the cam portion 118a is brought in contact with the outer side end 115c1 of the other end portion 115c of the half nut lever 115. When the pinion gear 137 is rotated in accordance with the chucking operation, the cam lever 118 is moved by means of the rack 119 so that the cam portion 118a is separated from the outer side end 115c1 of the other end portion 115c of the half nut lever 115 (as shown by a two-dot chain line in FIG. 11).

Under the condition that the cam lever 118 is being moved when the chucking operation is released and that the cam portion 118a of the cam lever 118 is brought in contact with the outer side end 115c1 of the other end portion 115c of the half nut lever 115, the half nut lever 115 is restricted in rotation under spring force of the tension coil spring 117 (condition shown by a solid line in FIG. 11). In this state, the pitch of the half nut 61 relative to the feed screw 53 is set so that the half nut 61 is engaged with the feed screw 53 properly.

Under the condition that the cam lever 118 is being moved upon chucking operation and the cam portion 118a of the cam lever 118 is away from the outer side end 115c1 of the other end portion 115c of the half nut lever 115, the half nut lever 115 is rotated under spring force of the tension coil spring 117, whereby the half nut 61 is urged against the feed screw 53 and then engaged therewith in a wedge fashion (condition shown by a two-dot chain line in FIG. 11).

When the half nut lever 115 is rotated such that the half nut 61 is strongly urged against the feed screw 53, there occurs a repulsive force, i.e., the half nut lever 115 is rotated about the engagement portion in which the half nut 61 is engaged with the feed screw 53. As a result, the shaft pin 116 pushes the bearing portion 103a of the translating chassis 51, whereby the translating chassis 51 is moved to the direction of the feed screw 52 opposing the feed screw 53. Consequently, the nut 60 is engaged with the feed screw 52.

That is to say, a back-lash between the feed screw 52 and the nut 60 and between the feed screw 53 and the half nut 61 is removed so that the translating chassis 1 is restricted in position with respect to the two feed screws 52, 53.

As described above, under the disc chucking releasing state of the disc reproducing and driving apparatus B, the nut 60 and the half nut 61 of the bearings 59a, 59b are properly meshed with the feed screws 52, 53 so as to have a small backlash so that the translating chassis 51 is translated by a normal feed screw load brought about by the rotation of the feed screws 52, 53. Meanwhile, under the disc chucking state of the disc reproducing and driving apparatus B, the nut 60 and the half nut 61 are deeply meshed with the feed screws 52, 53 without back-lash. Consequently, the translating chassis 51 is firmly in engagement with the feed screws 52, 53.

Therefore, the translating chassis 51 is smoothly and positively moved relative to the disc magazine loading unit A when the disc D is selected. When the disc D is reproduced, the translating chassis 51 is held in the fixed state and can be improved in vibration proof characteristic so that the disc D can be reproduced stably.

The shape of the half nut lever 115 and the rotating means of the half nut lever 115 or the like are not limited to those described above and may be freely varied in response to various factors such as a space in which the translating chassis 51 is disposed. Further, the shape of cam lever 118 that operates the half nut lever 115 and the transmission mechanism that transmits a driving force to the cam lever 118 are not limited to those that are rotated by the chucking drive motor and may be such a member that is driven by a driving source of an operation mechanism mounted on the translating chassis 51.

Furthermore, the present invention is not limited to the disc auto-changer player and may be applied to an auto-changer player for a cartridge in which discs are accommodated or the like. The loading and unloading directions of the disc magazine may be properly selected in a wide variety of directions, such as the disc stacking direction, the horizontal direction or the like.

As described above, according to the present invention, since the selecting operation mechanism that selects media includes an eject operation unit, if the selecting operation mechanism is maintained in the eject mode, then when the selecting operation mechanism is held in the eject mode and the media magazine is loaded erroneously or when the driving power supply is turned off, the media magazine can be ejected and unloaded by the eject mechanism with ease without using the special tool.

Further, since the eject mechanism can be driven by effectively utilizing the driving source of the translating mechanism that is translated in the media reproducing and driving mechanism without an exclusively-designed driving source, the present invention becomes advantageous from a cost and space factor standpoint. Thus, the media auto-changer player can be miniaturized on the whole.

Furthermore, according to the present invention, since the gear member is properly meshed with the feed screw and only the normal feed screw load acts on the gear member during translation of the chassis that is translated by the rotation of the feed screw via the gear member, the translating chassis is translated smoothly. Also, since the gear member is deeply engaged with the feed screw and is closely engaged therewith when the mounted operating mechanism is operated under the condition that the translating chassis is in the stop mode, the translating chassis is supported in the fixed condition and the mounted operation mechanism can be improved in vibration-proof characteristic. Therefore, the disc auto-changer player of the present invention can be operated stably.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A disc changer player comprising:

a housing;

a disc loading unit disposed in said housing into which there is loaded a disc accommodating magazine in which a plurality of discs are accommodated in a stacked condition;

a translating chassis disposed in said housing and being movable in a disc stacking direction of said plurality of discs relative to said disc loading unit;

a disc reproducing mechanism mounted on said translating chassis;

an eject mechanism disposed in said housing comprising a magazine supporting mechanism for urging said disc accommodating magazine in a direction to eject said disc accommodating magazine from said disc loading unit, and a lock mechanism for locking said magazine supporting mechanism by clamping said disc accommodating magazine under a condition that said disc accommodating magazine is loaded into said disc loading unit, wherein said lock mechanism is biased toward a locking state locking said disc accommodating magazine in said disc loading unit; and selecting operation means disposed in said housing for releasing said lock mechanism from said locking state and for selecting a desired disc by controlling a translation of said translating chassis, wherein said eject mechanism further comprises an air resistance mechanism selectively coupled to said magazine supporting mechanism, wherein when said disc accommodating magazine is ejected, said air resistance mechanism is coupled to said magazine supporting mechanism while when said disc accommodating magazine is loaded, said air resistance mechanism is released from being coupled to said magazine supporting mechanism, and wherein said air resistance mechanism comprises a vane wheel including a plurality of blades and a pinion integrally formed at a central shaft portion.

2. A disc changer player comprising:

a housing;

a disc loading unit disposed in said housing into which there is loaded a disc accommodating magazine in which a plurality of discs are accommodated in a stacked condition;

a translating chassis disposed in said housing and being movable in a disc stacking direction of said plurality of discs relative to said disc loading unit;

a disc reproducing mechanism mounted on said translating chassis;

an eject mechanism disposed in said housing comprising a magazine supporting mechanism for urging said disc accommodating magazine in a direction to eject said disc accommodating magazine from said disc loading unit, and a lock mechanism for locking said magazine supporting mechanism by clamping said disc accommodating magazine under a condition that said disc accommodating magazine is loaded into said disc loading unit, wherein said lock mechanism is biased toward a locking state locking said disc accommodating magazine in said disc loading unit; and selecting operation means disposed in said housing for releasing said lock mechanism from said locking state and for selecting a desired disc by controlling a translation of said translating chassis, wherein said magazine supporting mechanism comprises a magazine receiving plate, a pantograph-shaped expanding and contracting mechanism, and spring means for biasing said pantograph-shaped expanding and contacting mechanism in an expanding direction, and wherein said spring means comprises a first spring mounted on said housing for biasing said eject frame and a second spring connected to an eject arm forming part of said pantograph-shaped mechanism at a first end and to said housing at a second end.

3. A disc changer player comprising;

a housing;

a disc loading unit disposed in said housing into which there is loaded a disc accommodating magazine in which a plurality of discs are accommodated in a stacked condition;

a translating chassis disposed in said housing and being movable in a disc stacking direction of said plurality of discs relative to said disc loading unit;

a disc reproducing mechanism mounted on said translating chassis;

an eject mechanism disposed in said housing comprising a magazine supporting mechanism for urging said disc accommodating magazine in a direction to eject said disc accommodating magazine from said disc loading unit, and a lock mechanism for locking said magazine supporting mechanism by clamping said disc accommodating magazine under a condition that said disc accommodating magazine is loaded into said disc loading unit, wherein said lock mechanism is biased toward a locking state locking said disc accommodating magazine in said disc loading unit; and selecting operation means disposed in said housing for releasing said lock mechanism from said locking state and for selecting a desired disc by controlling a translation of said translating chassis, wherein said lock mechanism comprises a first locking member;

a second locking member coupled to said first locking member;

biasing means connected to said first locking member for biasing said lock mechanism toward said locking state; and a lock release lever engageable with said second locking member and with said selecting operation means for releasing said lock mechanism from said locking state against a bias force of said biasing means, and wherein said first locking member and second locking member each comprises a locking click for clamping said disc accommodating magazine.

* * * * *